United States Patent
Harada et al.

(10) Patent No.: US 8,408,690 B2
(45) Date of Patent: Apr. 2, 2013

(54) ACTIVE ENERGY RAY CURABLE INK JET RECORDING LIQUID COMPOSITION AND INK JET RECORDING METHOD USING THE SAME

(75) Inventors: Kouji Harada, Kawasaki (JP); Kenji Shinjo, Yokohama (JP); Shinsuke Tsuji, Kawasaki (JP); Yutaka Kurabayashi, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 13/081,838

(22) Filed: Apr. 7, 2011

(65) Prior Publication Data

US 2011/0261129 A1 Oct. 27, 2011

(30) Foreign Application Priority Data

Apr. 22, 2010 (JP) ................. 2010-098781

(51) Int. Cl.
*C09D 11/00* (2006.01)
(52) U.S. Cl. ....................................... 347/100
(58) Field of Classification Search ................ 347/100
See application file for complete search history.

(56) References Cited

U.S. PATENT DOCUMENTS

| | | | |
|---|---|---|---|
| 5,081,470 A | 1/1992 | Kurabayashi et al. | |
| 5,124,201 A | 6/1992 | Kurabayashi et al. | |
| 5,137,778 A | 8/1992 | Nakatsugawa et al. | |
| 5,171,626 A | 12/1992 | Nagamine et al. | |
| 5,246,774 A | 9/1993 | Sakaki et al. | |
| 5,277,962 A | 1/1994 | Nakatsugawa et al. | |
| 5,362,558 A | 11/1994 | Sakaki et al. | |
| 5,415,686 A | 5/1995 | Kurabayashi et al. | |
| 5,439,515 A | 8/1995 | Kurabayashi et al. | |
| 5,526,031 A | 6/1996 | Kurabayashi | |
| 5,549,740 A | 8/1996 | Takahashi et al. | |
| 5,614,007 A | 3/1997 | Kurabayashi et al. | |
| 5,618,338 A | 4/1997 | Kurabayashi et al. | |
| 5,623,294 A | 4/1997 | Takizawa et al. | |
| 5,624,484 A | 4/1997 | Takahashi et al. | |
| 5,651,814 A | 7/1997 | Shimomura et al. | |
| 5,700,314 A | 12/1997 | Kurbayashi et al. | |
| 5,734,403 A | 3/1998 | Suga et al. | |
| 5,792,249 A | 8/1998 | Shirota et al. | |
| 5,835,116 A | 11/1998 | Sato et al. | |
| 5,849,815 A | 12/1998 | Aoki et al. | |
| 5,985,975 A | 11/1999 | Kurabayashi et al. | |
| 6,027,210 A | 2/2000 | Kurabayashi et al. | |
| 6,114,020 A | 9/2000 | Misuda et al. | |
| 6,238,045 B1 | 5/2001 | Ono et al. | |
| 6,322,209 B1 | 11/2001 | Sato et al. | |
| 6,341,855 B1 | 1/2002 | Kurabayashi | |
| 6,342,096 B1 | 1/2002 | Kurabayashi | |
| 6,367,921 B1 | 4/2002 | Kurabayashi et al. | |
| 6,391,440 B1 | 5/2002 | Yoshino et al. | |
| 6,398,355 B1 | 6/2002 | Shirota et al. | |
| 6,399,674 B1 | 6/2002 | Kashiwazaki et al. | |
| 6,412,936 B1 | 7/2002 | Mafune et al. | |
| 6,460,989 B1 | 10/2002 | Yano et al. | |
| 6,471,757 B1 | 10/2002 | Koitabashi et al. | |
| 6,517,199 B1 | 2/2003 | Tomioka et al. | |
| 6,521,323 B1 | 2/2003 | Sakaki et al. | |
| 6,536,890 B1 | 3/2003 | Kato et al. | |
| 6,670,000 B1 | 12/2003 | Misuda et al. | |
| 6,719,420 B2 | 4/2004 | Tomioka et al. | |
| 6,730,375 B2 | 5/2004 | Moriya et al. | |
| 6,746,114 B2 | 6/2004 | Takahashi et al. | |
| 6,770,687 B1 * | 8/2004 | Tan et al. ................. | 523/161 |
| 6,780,901 B1 | 8/2004 | Endo et al. | |
| 6,783,229 B1 | 8/2004 | Inamoto et al. | |
| 6,790,878 B2 | 9/2004 | Kurabayashi | |
| 6,794,427 B2 | 9/2004 | Kurabayashi et al. | |
| 6,811,839 B2 | 11/2004 | Hiro et al. | |
| 6,821,328 B2 | 11/2004 | Tomioka et al. | |
| 6,966,944 B2 | 11/2005 | Shimomura et al. | |
| 7,198,837 B1 | 4/2007 | Endo et al. | |
| 7,208,032 B2 | 4/2007 | Hakamada et al. | |
| 7,285,310 B2 | 10/2007 | Kanke et al. | |
| 7,297,194 B2 | 11/2007 | Shinjo et al. | |
| 7,503,649 B2 | 3/2009 | Kishi et al. | |
| 7,517,073 B2 | 4/2009 | Nito et al. | |
| 7,517,074 B2 | 4/2009 | Hakamada et al. | |
| 7,976,148 B2 | 7/2011 | Kishi et al. | |
| 2002/0004539 A1 * | 1/2002 | Smith ........................ | 523/161 |
| 2002/0065335 A1 | 5/2002 | Noguchi et al. | |
| 2010/0094024 A1 | 4/2010 | Shinjo et al. | |
| 2010/0271418 A1 | 10/2010 | Shimomura et al. | |
| 2010/0324163 A1 | 12/2010 | Shinjo | |
| 2011/0104453 A1 | 5/2011 | Shinjo et al. | |

FOREIGN PATENT DOCUMENTS

| | | |
|---|---|---|
| JP | 2000-117960 A | 4/2000 |
| JP | 2000-186243 A | 7/2000 |
| JP | 2002-080767 A | 3/2002 |
| JP | 2002-187918 A | 7/2002 |
| JP | 2003-040923 A | 2/2003 |
| JP | 2007-245630 A | 9/2007 |
| JP | 2007-314610 A | 12/2007 |
| JP | 2007-314611 A | 12/2007 |
| JP | 2007-314612 A | 12/2007 |
| JP | 2008-024830 A | 2/2008 |

\* cited by examiner

*Primary Examiner* — Laura Martin

(74) *Attorney, Agent, or Firm* — Fitzpatrick, Cella, Harper & Scinto

(57) ABSTRACT

The invention provides an active energy ray curable ink jet recording liquid composition including a radically polymerizable compound, an active energy ray polymerization initiator, a wax and water, wherein the melting point of the wax is 40° C. or more and 120° C. or less.

3 Claims, No Drawings

ACTIVE ENERGY RAY CURABLE INK JET RECORDING LIQUID COMPOSITION AND INK JET RECORDING METHOD USING THE SAME

BACKGROUND OF THE INVENTION

1. Field of the Invention

The present invention relates to an active energy ray curable ink jet recording liquid composition, and also relates to an ink jet recording method using the liquid composition.

2. Description of the Related Art

In recent years, there has been a demand for developing an ink jet recording method in which an aqueous ink jet recording ink is applied to a recording medium, and the recording medium is then irradiated with active energy rays, as well as an active energy ray curable ink used in this recording method. Japanese Patent Application Laid-Open No. 2002-80767 has proposed a technique for improving the scratch resistance and water resistance of an image using an aqueous active energy ray curable ink jet recording ink composition containing a polyurethane compound containing a group having an unsaturated double bond curable by irradiation of active energy rays, a basic compound, a colorant, a water-soluble organic solvent and water.

However, the image formed with the ink prepared by the method described in Japanese Patent Application Laid-Open No. 2002-80767 may have not satisfied the scratch resistance and water resistance of the level required by the present inventors in some cases. For example, sufficient resistance may have not been achieved against such severe scratching as being scratched under a condition where moisture is applied.

Accordingly, it is an object of the present invention to provide an active energy ray curable ink jet recording liquid composition capable of giving extremely excellent scratch resistance and water resistance to an image. Another object of the present invention is to provide an excellent ink jet recording method capable of forming an image excellent in scratch resistance and water resistance by using the active energy ray curable ink jet recording liquid composition.

SUMMARY OF THE INVENTION

The above objects are achieved by the present invention described below. In short, the present invention provides an active energy ray curable ink jet recording liquid composition comprising (1) a radically polymerizable compound, (2) an active energy ray radical polymerization initiator, (3) a wax and (4) water, wherein the melting point of the wax is 40° C. or more and 120° C. or less.

In another aspect of the present invention, there is provided an ink jet recording method comprising applying a liquid composition to a recording medium, wherein the liquid composition is the above-described liquid composition containing the wax, the method comprising an application step of applying the liquid composition to the recording medium by an ink jet system, a heating step of heating the recording medium at a temperature not lower than the melting point of the wax in the liquid composition, and a curing step of curing the liquid composition by irradiating the recording medium with an energy ray, wherein the heating step and the curing step are conducted after the application step.

According to the present invention, there can be provided an active energy ray curable ink jet recording liquid composition capable of forming an ink jet recorded article (image) having excellent scratch resistance and water resistance. According to another aspect of the present invention, there can also be provided an active energy ray curable ink jet recording liquid composition further containing a coloring material, and a recording method using the liquid composition.

Further features of the present invention will become apparent from the following description of exemplary embodiments.

DESCRIPTION OF THE EMBODIMENTS

Preferred embodiments of the present invention will now be described in detail.

The present inventors infer that the reason why an image having excellent scratch resistance and water resistance can be provided by using the liquid composition according to the present invention is as follows.

The liquid composition according to the present invention contains a wax. The wax is a compound excellent in lubricating property, i.e., small in coefficient of friction for surfaces. Therefore, the scratch resistance of an image (coating film) formed with the liquid composition can be improved by adding the wax.

The liquid composition according to the present invention contains a radically polymerizable compound. For the radically polymerizable compound, a reaction rate between the radically polymerizable compound and oxygen may be faster than a reaction rate between mutual radically polymerizable compounds in some cases. When oxygen is present in the system in which a radical reaction is conducted, thus the reaction of the oxygen with the radically polymerizable compound takes place preferentially, and the radical reaction may be stopped in some cases. On the other hand, since the specific gravity of the wax is generally lighter than that of water, the wax is present preferentially on the outer surface side with respect to a recording medium compared with other components in the liquid composition when the liquid composition is applied to the recording medium. A physical contact of oxygen introduced into the recording medium from the air with the radically polymerizable compound can be thereby prevented, and the radical reaction can be caused to smoothly proceed. As a result, the radically polymerizable compound can form a stronger film and can more improve the water resistance and scratch resistance.

The present invention will hereinafter be described in detail by the following preferred embodiments. Incidentally, ultraviolet rays or electron beams may be used as the active energy rays used in the present invention. However, description will hereinafter be given taking, as a typical example, an ultraviolet ray curable liquid composition that is cured by radical polymerization with ultraviolet rays.

Radically Polymerizable Compound

No particular limitation is imposed on the radically polymerizable compound used in the present invention so far as the compound has an unsaturated double bond in its molecule and is polymerized by a radical reaction. In addition, the maximum value A of a gram extinction coefficient in a range of 300 nm or more and 450 nm or less of the polymerizable compound is favorably 5,000 or less, more favorably 3,000 or less, most favorably 1,000 or less.

The gram extinction coefficient can be calculated according to the following equation (1). Specifically, a solution with a radically polymerizable compound dissolved in water at a known concentration is placed in a cell having an optical path length of 1 cm to measure the transmittance, and the transmittance and the concentration are put into the following equation (1), whereby the gram extinction coefficient of the radically polymerizable compound can be determined.

$$\mathrm{Log}(T/100) = -E \times C. \qquad \text{Equation (1)}$$

(In the equation (1), T is the transmittance (%) of the aqueous solution, E is the gram extinction coefficient of the radically polymerizable compound, and C is the concentration (g/cc) of the radically polymerizable compound in the aqueous solution.)

The radically polymerizable compound is favorably water-soluble, and such publicly known water-soluble radically polymerizable compounds as disclosed in the following documents may be used in the present invention. Examples thereof include the compounds described in Japanese Patent Application Laid-Open No. 2000-117960, Japanese Patent Application Laid-Open No. 2000-186243, Japanese Patent Application Laid-Open No. 2002-187918, Japanese Patent Application Laid-Open No. 2007-245630, Japanese Patent Application Laid-Open No. 2007-314610, Japanese Patent Application Laid-Open No. 2007-314611 and Japanese Patent Application Laid-Open No. 2007-314612, and such polymer compounds having a molecular weight exceeding 1,000 as disclosed in Japanese Patent Application Laid-Open No. 2003-40923 and Japanese Patent Application Laid-Open No. 2008-024830. Among the water-soluble radically polymerizable compounds, such compounds having an amide bond as shown in the following Exemplified Compound 4 and such compounds having an ester bond as shown in the following Exemplified Compound 5 are favorably used. No particular limitation is imposed on the content of the radically polymerizable compound used. However, the content is favorably 30% by mass or less from the viewpoint of ejection performance, and more favorably 5% by mass or more and 20% by mass or less.

Exemplified Compound 4

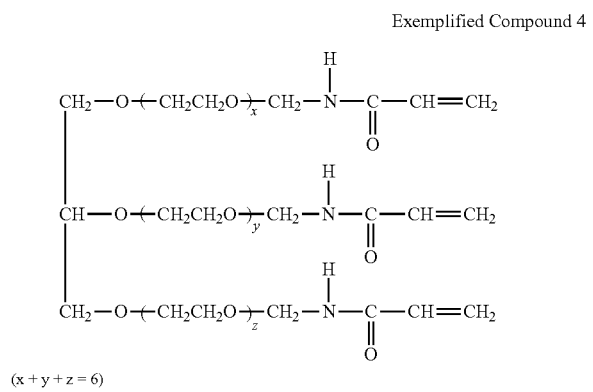

$(x+y+z=6)$

Exemplified Compound 5

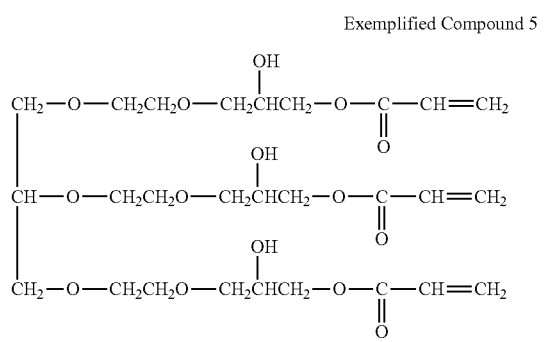

Active Energy Ray Polymerization Initiator

No particular limitation is imposed on the active energy ray radical polymerization initiator used in the present invention so far as the initiator forms radicals that are active species initiating the polymerization of the radically polymerizable compound by receiving light. The polymerization initiator which forms the radicals by receiving light is favorable because the rate of forming the radicals is fast, and a curing reaction of the liquid composition can be caused to smoothly proceed.

When the liquid composition according to the present invention is an ink composition containing a coloring material, a polymerization initiator having a group exhibiting water solubility in its structure is favorably used. Specific examples of the group exhibiting the water solubility include hydroxyl, carboxyl, sulfonic, phosphoric, carboxylate, sulfonate, phosphate, ether and amide groups. Incidentally, when the coloring material is a coloring material having an anionic group, a polymerization initiator having another group exhibiting water solubility than an ester group is favorably used. Specific structures of polymerization initiators favorably used in the present invention are shown below. However, the polymerization initiators used in the present invention are not limited to these structures.

Exemplified Compound 1

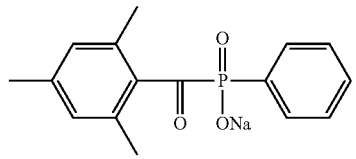

Exemplified Compound 2

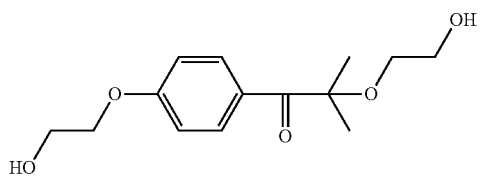

Exemplified Compound 3

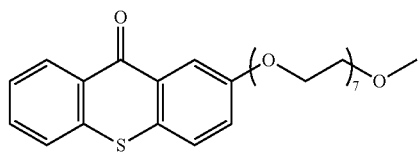

The content of such a polymerization initiator as described is favorably 0.01% by mass or more and 20% by mass or less, more favorably 0.01% by mass or more and 10% by mass or less, most favorably 0.01% by mass or more and 5% by mass or less, based on the total amount of the liquid composition. If the content of the polymerization initiator in the liquid composition is more than 20% by mass, an unreacted polymerization initiator remains in a cured film, and so the strength of the cured film may be lowered in some cases. Thus, such a too high content is not favorable.

Wax

The wax used in the present invention means an organic material that is solid and has a melting point at ordinary temperature. Specifically, the wax is a solid material containing, as a main component, any one of, for example, hydrocarbons, higher fatty acids, higher alcohols, higher fatty acid esters, higher amines and higher amides.

In more detail, examples of the wax include solid materials including vegetable waxes such as carnauba wax, Japan wax, Ouricury wax and Espar wax, and animal waxes such as beeswax, insect wax and shellac wax, which are natural waxes; petroleum waxes such as paraffin wax and microcrystalline wax; and mineral waxes such as montan wax, ozokerite and ceresin. Examples of synthetic waxes include hydrocarbon waxes such as Fischer-Tropsch wax, polyethylene wax and polypropylene wax, and oxidized waxes with a polar group contained in paraffin wax. More specifically, examples thereof include solid materials including higher fatty acids such as palmitic acid, stearic acid, margaric acid and behenic acid; higher alcohols such as palmityl alcohol, stearyl alcohol, behenyl alcohol, marganyl alcohol, myricyl alcohol and eicosanol; higher fatty acid esters such as cetyl palmitate, myricyl palmitate, cetyl stearate and myricyl stearate; amides such as acetamide, propionic amide, palmitic amide, stearic amide and amide wax; and higher amines such as stearylamine, behenylamine and palmitylamine; and besides synthetic waxes such as ethylene-vinyl acetate copolymers.

The liquid composition according to the present invention features that among the above-mentioned waxes, a wax having a melting point of 40° C. or more and 120° C. or less is used. However, a wax having a melting point within a range of 60° C. or more and 90° C. or less is more favorable. In other words, since a wax having a melting point lower than 40° C. is poor in the stability of the wax at a high temperature, the dispersibility of a coloring material is deteriorated with time when the wax and the coloring material are contained. On the other hand, with a wax having a melting point exceeding 120° C., evaporation of water concurrently occurs in the heating step of the coating film, so that the flowability of the liquid composition itself is markedly deteriorated, and such a wax may be hard to segregate on the surface in some cases. In addition, if the wax having a melting point exceeding 120° C. is used, the particles of the wax tend to coarsen, so that the dispersibility thereof is deteriorated, and in turn, the lowering of lubricating property on the surface is observed. Generally speaking, the scratch resistance of an ink image formed may be deteriorated in some cases.

Further, a wax composed of only carbon and hydrogen among the above-mentioned waxes is favorably used in the present invention. Examples of such a wax include paraffin wax, polyethylene wax, polypropylene wax, microcrystalline wax and Fischer-Tropsch wax. A wax containing other elements than carbon and hydrogen tends to have high polarity, so that when an image is formed with a liquid composition containing such a wax, the water resistance thereof may be lowered in some cases. A wax is generally marketed as a wax dispersion liquid containing a wax component (solid matter) and a dispersion medium. When such a wax dispersion liquid is used, regarding the content of the wax dispersion liquid, the wax dispersion liquid is favorably contained in an amount of 0.5 parts by mass or more and 5 parts by mass or less when the total mass of the liquid composition is regarded as 100 parts by mass, and is more favorably contained in a range of 1 part by mass or more and 3 parts by mass or less. The content of the wax component in the wax dispersion liquid is favorably 20% by mass or more and 50% by mass or less based on the total mass of the wax dispersion liquid.

Solvent

The liquid composition according to the present invention contains water as a solvent component. The content of water cannot be generalized because it varies according to uses and styles. However, the content is favorably 10% by mass or more and 90% by mass or less based on the total mass of the liquid composition. When the liquid composition is applied to an ink jet recording system in particular, the content of water is favorably 30% by mass or more and 90% by mass or less, more favorably 50% by mass or more and 90% by mass or less. The liquid composition according to the present invention may contain various kinds of organic solvents in addition to water. As the organic solvents, may be used publicly known organic solvents such as triethylene glycol. The content of the organic solvents is favorably 3% by mass or more and 70% by mass or less based on the total mass of the liquid composition.

Other Components

The liquid composition according to the present invention may be used as a clear ink containing no coloring material and being curable by irradiation of active energy rays. The clear ink can be used for uses such as an undercoat for imparting various suitabilities for image recording to a recording medium and an overcoat for the purpose of protecting the surface of an image formed with an ordinary ink and imparting decoration and gloss.

The liquid composition according to the present invention may contain a coloring material in addition to the above-described components. The constitution in such a case and coloring materials used will be described. The coloring material is caused to be contained, whereby the liquid composition according to the present invention can be used as a color ink curable by irradiation of active energy rays. As a result, when recording is conducted with the color ink on, for example, a non-absorbable/poorly absorbable medium by an ink jet system, an ink image exhibiting extremely excellent scratch resistance and water resistance can be formed. No particular limitation is imposed on the coloring material used in this case, and publicly known pigments and dyes may be applied. As the publicly known pigments and dyes, may be mentioned those indicated by C.I. (COLOR INDEX) numbers. When a black pigment is used, carbon black is favorably used. Incidentally, when a pigment is used, a dispersant may be used in combination. The dispersant is favorably a copolymer composed of a hydrophobic monomer and a hydrophilic monomer, such as a styrene-acrylic acid copolymer. The content of the coloring material in the liquid composition is favorably 1% by mass or more and 10% by mass or less based on the total mass of the liquid composition.

Ink Jet Recording Method

The ink jet recording method according to the present invention has an application step of applying the liquid composition of the present invention to a recording medium by an ink jet system, a heating step of heating the recording medium at a temperature not lower than the melting point of a wax in the liquid composition, and a curing step of curing the liquid composition by irradiating the recording medium with an energy ray, and the heating step and the curing step are conducted after the application step. In the present invention, the wax is fused, where the smoothness of the liquid composition applied to the recording medium can be enhanced. Either one of the heating step and the curing step may be conducted earlier. However, it is favorable that the heating step is conducted earlier, and the curing step is conducted later because the wax fused has flowability, and the smoothness of the liquid composition is enhanced by the flowability.

EXAMPLES

The present invention will hereinafter be described in more detail by specific Examples of the active energy ray curable ink jet recording liquid composition according to the present invention and Comparative Examples thereof. The present invention is not limited by the following Examples unless going beyond the gist of the present invention. Incidentally, Exemplified Compound 1, the structure of which has been shown above, was used as a water-soluble active energy ray radical polymerization initiator in Examples, and Exemplified Compounds 4 and 5, the structures of which have been shown above, were used as radically polymerizable compounds.

The following commercially available wax dispersion liquids were used as the wax.
Wax Dispersion Liquid 1: microcrystalline wax (product of NIPPON SEIRO CO., LTD; EMUSTAR-0001, solid content concentration: 40%, melting point: 84° C.)
Wax Dispersion Liquid 2: carnauba wax (product of NIPPON SEIRO CO., LTD; EMUSTAR-0413, solid content concentration: 40%, melting point: 80° C.)
Wax Dispersion Liquid 3: Fischer-Tropsch wax (product of NIPPON SEIRO CO., LTD; EMUSTAR-6315D, solid content concentration: 40%, melting point: 115° C.)
Wax Dispersion Liquid 4: paraffin wax (product of NIPPON SEIRO CO., LTD; EMUSTAR-1115, solid content concentration: 40%, melting point: 47° C.)
The following Wax 5 having a melting point exceeding 120° C. was used as a wax in Comparative Examples. Wax Dispersion Liquid 5: calcium stearate (product of SAN NOPCO LIMITED; NOPCO 1097-AH, solid content concentration: 55%, melting point: 150° C.)
The respective components shown in Table 1 were mixed, thoroughly stirred and then filtered under pressure through a filter having a pore size of 5.0 μm to prepare Example Compositions 1 to 8 and Comparative Compositions 1 and 2. Incidentally, all designations of parts in the ink components mean "parts by mass" unless expressly noted.

heat a recorded article with hot air right after recording. The flow rate of the hot air upon heating was controlled to 9 m/sec. In addition, this apparatus was an apparatus modified so as to be able to be irradiated with active energy rays. Specifically, a UV lamp in which a mercury lamp is exited electrodelessly from the outside using micro waves was installed at a position adjacent to the heating device. As the UV lamp, was used a D bulb. The intensity of the UV lamp was controlled to 1,500 mW/cm$^2$. The properties of a cured film in each of the resulting recorded articles were evaluated according to evaluation methods and evaluation criteria described in the following (1) to (3).
Evaluation of Properties of Cured Film
(1) Scratch Resistance
Scratch Resistance Evaluation with PMMA Resin Ball
Example Compositions 1 to 8, Comparative Compositions 1 and 2, and the above-described ink jet recording apparatus were used to apply the pigment ink at a 100% duty to 10 sheets of offset paper "OK KINFUJI" (product of MITSUBISHI PAPER MILLS LIMITED). Example Compositions 1 to 8, and Comparative Compositions 1 and 2 were then respectively applied at 100% duty to the images formed on the 10 sheets of offset paper with the pigment ink. Thereafter, the resultant recorded articles were heated with hot air of a temperature of +5° C. higher than the melting point of the wax in

TABLE 1

Composition of liquid composition

|  |  | m.p. (°C.) | Example Composition |  |  |  |  |  |  |  | Comparative Composition |  |
|---|---|---|---|---|---|---|---|---|---|---|---|---|
|  |  |  | 1 | 2 | 3 | 4 | 5 | 6 | 7 | 8 | 1 | 2 |
| Polymerizable compound | Exemp'd Comp'd 4 |  | 20 | 20 | 20 | 20 |  |  |  |  | 20 |  |
|  | Exemp'd Comp'd 5 |  |  |  |  |  | 20 | 20 | 20 | 20 |  | 20 |
| Polymerization initiator | Exemp'd Comp'd 1 |  | 4 | 4 | 4 | 4 | 4 | 4 | 4 | 4 | 4 | 4 |
| Wax dispersion liquid | Wax 1*[1] | 84 | 1.5 |  |  |  | 1.5 |  |  |  |  |  |
|  | Wax 2*[2] | 80 |  | 1.5 |  |  |  | 1.5 |  |  |  |  |
|  | Wax 3*[3] | 115 |  |  | 1.5 |  |  |  | 1.5 |  |  |  |
|  | Wax 4*[4] | 47 |  |  |  | 1.5 |  |  |  | 1.5 |  |  |
|  | Wax 5*[5] | 150 |  |  |  |  |  |  |  |  | 1.1 | 1.1 |
| Organic solvent | Triethylene glycol |  | 10 | 10 | 10 | 10 | 10 | 10 | 10 | 10 | 10 | 10 |
| Surfactant | Silicone based |  | 0.1 | 0.1 | 0.1 | 0.1 | 0.1 | 0.1 | 0.1 | 0.1 | 0.1 | 0.1 |
| Water (ion-exchanged water) |  |  | 64.4 | 64.4 | 64.4 | 64.4 | 64.4 | 64.4 | 64.4 | 64.4 | 64.8 | 64.8 |

*[1]Microcrystalline wax (product of NIPPON SEIRO CO., LTD; EMUSTAR-0001)
*[2]Carnauba wax (product of NIPPON SEIRO CO., LTD; EMUSTAR-0413)
*[3]Fischer-Tropsch wax (product of NIPPON SEIRO CO., LTD; EMUSTAR-6315D)
*[4]Paraffin wax (product of NIPPON SEIRO CO., LTD; EMUSTAR-1115)
*[5]Calcium stearate (product of SAN NOPCO LIMITED; NOPCO 1097-AH).

Evaluation of Properties
Formation of Image
An On-Demand type ink jet recording apparatus PIXUS 9100i (manufactured by Canon Inc.) in which an ink is ejected by applying thermal energy to the ink according to recording signals was first prepared as an image forming apparatus. An ink cartridge into which each of Example Compositions and Comparative Compositions was filled and an ink cartridge into which a pigment ink (BCI-3eBk, product of Canon Inc.) was filled were set at the positions of yellow and black, respectively, in the ink jet recording apparatus. As a heating device, was used a device modified so as to be able to each of the compositions to fuse the waxes. Specifically, the heating with hot air of 89° C. was conducted on the recording medium to which Example Composition 1 had been applied, and the heating with hot air of 85° C. was conducted on the recording medium to which Example Composition 2 had been applied. Thereafter, regions of the recording media to which Example Compositions 1 to 8 and Comparative Compositions 1 and 2 had been respectively applied, were irradiated with ultraviolet rays under the above-described irradiation conditions to obtain coating films (images).
After 10 minutes from the formation of the coating films, force was applied to each region of the recorded articles obtained above where the coating layer had been formed, i.e., each region, to which the pigment ink and Example Composition or Comparative Composition had been applied, by means of a surface property tester (trade name: HEIDON TRIBOGEAR TYPE 14DR; manufactured by SHINTO SCIENTIFIC CO., LTD.), thereby conducting a scratch resistance test. Specifically, a resin ball (polymethyl methacrylate (PMMA)) having a diameter of 4 mm was fixed to a ball presser holder of the surface property tester, vertically pressed against the recorded article and moved along the surface of the recorded article at a rate of 40 mm/sec. The condition of resulting scratches when the vertical load applied to the resin ball was increased stepwise up to the maximum of 2,000 g from 10 g was visually evaluated.

The evaluation criteria of the scratch resistance with the PMMA resin ball are as follows. The evaluation results are shown in Table 2.
A: No scratch due to peeling occurs up to the maximum vertical load of 2,000 g;
B: Scratch due to peeling occurs under a vertical load of 1,000 g or more and less than 2,000 g;
C: Scratch due to peeling occurs under a vertical load of 200 g or more and less than 1,000 g;
D: Scratch due to peeling occurs under a vertical load less than 200 g.

Scratch Resistance Against Nail

Each recorded article obtained in the same manner as in the scratch resistance with the resin ball was used to evaluate the scratch resistance against a nail of each recorded article. Specifically, a region of the recorded article where the coating layer had been formed was actually scratched with a human nail to visually evaluate the condition of resulting scratches. The evaluation criteria of the scratch resistance against the nail are as follows. The evaluation results are shown in Table 2.
A: Neither scratch due to peeling nor fine surface defects occurs even when scratched repeatedly with a nail;
B: No scratch due to peeling occurs but a surface defect occurs when scratched repeatedly with a nail;
C: Scratch due to peeling somewhat occurs when scratched repeatedly several times with a nail;
D: Scratch due to peeling somewhat occurs when scratched once with a nail.

(2) Water Resistance (Water and Scratch Resistance)

Each recorded article obtained in the same manner as in the scratch resistance with the resin ball was used to evaluate the water resistance of each recorded article. Specifically, 0.2 ml of a water droplet was dropped on the coating film (image) of the recorded article, and an image formed in a region of the recorded article where the water droplet had been dropped was rubbed with silbon paper after left to stand for 1 minute. Thereafter, the condition of the coating film formed on the recording medium was visually observed to make evaluation. The evaluation criteria of the water resistance are as follows. The evaluation results are shown in Table 2.

A: No image scrape is observed in the region rubbed with silbon paper;

B: An image scrape is slightly observed in the region rubbed with silbon paper;

C: An image scrape is observed in the region rubbed with silbon paper;

D: An image scrape caused in the region rubbed with silbon paper is marked.

TABLE 2

|  |  | Evaluation results | | | | | | | | | |
|---|---|---|---|---|---|---|---|---|---|---|---|
|  |  | Example Composition | | | | | | | | Comparative Composition | |
|  |  | 1 | 2 | 3 | 4 | 5 | 6 | 7 | 8 | 1 | 2 |
| Properties of cured film | Scratch resistance (PMMA resin ball) | A | A | A | B | A | A | A | B | C | C |
|  | Scratch resistance (scratch with nail) | A | A | A | B | A | A | A | B | C | C |
|  | Water and scratch resistance | A | B | A | A | A | B | B | A | C | C |

As shown in the evaluation results, it was apparent that Example Compositions 1 to 8 exhibit high scratch resistance and water resistance with a significant difference compared with the conventional Comparative Compositions when they are used as ink jet recording clear inks and applied to an image to form coating layers of recorded articles.

Properties of cured films were then evaluated by using a color ink containing a coloring material. A cyan pigment dispersion was first prepared in the following manner. C.I. Pigment blue 15:3 was used as a pigment, and a random polymer of styrene/acrylic acid/ethyl acrylate (average molecular weight: 3,500, acid value: 150 mg KOH/g) was used as a dispersant. These components were dispersed by a bead mill to obtain a cyan pigment dispersion having a pigment solid content of 10% by mass and a P/B ratio (ratio of the pigment to the binder) of 3:1. The respective components shown in Table 3 were mixed, thoroughly stirred and then filtered under pressure through a filter having a pore size of 5.0 μm to prepare respective active energy ray curable liquid compositions (cyan inks) of Example Compositions 9 to 16, and Comparative Compositions 3 and 4.

Example Compositions 9 to 16 and Comparative Compositions 3 and 4 were respectively applied at a 100% duty to 10 sheets of offset paper "OK KINFUJI" (product of MITSUBISHI PAPER MILLS LIMITED) by means of the same ink jet recording apparatus as that used for Example Compositions 1 to 8. The properties of cured films were evaluated according to the same evaluation methods and evaluation criteria as in Example Compositions 1 to 8. The results are shown in Table 4.

TABLE 3

Composition of ink composition

| | | m.p. (°C.) | Example Composition | | | | | | | | Comparative Composition | |
|---|---|---|---|---|---|---|---|---|---|---|---|---|
| | | | 9 | 10 | 11 | 12 | 13 | 14 | 15 | 16 | 3 | 4 |
| Pigment dispersion | | | 30 | 30 | 30 | 30 | 30 | 30 | 30 | 30 | 30 | 30 |
| Polymerizable compound | Exemp'd Comp'd 4 | | 20 | 20 | 20 | 20 | | | | | 20 | |
| | Exemp'd Comp'd 5 | | | | | | 20 | 20 | 20 | 20 | | 20 |
| Polymerization initiator | Exemp'd Comp'd 1 | | 4 | 4 | 4 | 4 | 4 | 4 | 4 | 4 | 4 | 4 |
| Wax dispersion liquid | Wax 1*[1] | 84 | 1.5 | | | | 1.5 | | | | | |
| | Wax 2*[2] | 80 | | 1.5 | | | | 1.5 | | | | |
| | Wax 3*[3] | 115 | | | 1.5 | | | | 1.5 | | | |
| | Wax 4*[4] | 47 | | | | 1.5 | | | | 1.5 | | |
| | Wax 5*[5] | 150 | | | | | | | | | 1.1 | 1.1 |
| Organic solvent | Triethylene glycol | | 10 | 10 | 10 | 10 | 10 | 10 | 10 | 10 | 10 | 10 |
| Surfactant | Silicone based | | 0.1 | 0.1 | 0.1 | 0.1 | 0.1 | 0.1 | 0.1 | 0.1 | 0.1 | 0.1 |
| Water (ion-exchanged water) | | | 34.4 | 34.4 | 34.4 | 34.4 | 34.4 | 34.4 | 34.4 | 34.4 | 34.8 | 34.8 |

*[1]Microcrystalline wax (product of NIPPON SEIRO CO., LTD; EMUSTAR-0001)
*[2]Carnauba wax (product of NIPPON SEIRO CO., LTD; EMUSTAR-0413)
*[3]Fischer-Tropsch wax (product of NIPPON SEIRO CO., LTD; EMUSTAR-6315D)
*[4]Paraffin wax (product of NIPPON SEIRO CO., LTD; EMUSTAR-1115)
*[5]Calcium stearate (product of SAN NOPCO LIMITED; NOPCO 1097-AH).

TABLE 4

Evaluation results

| | | Example Composition | | | | | | | | Comparative Composition | |
|---|---|---|---|---|---|---|---|---|---|---|---|
| | | 9 | 10 | 11 | 12 | 13 | 14 | 15 | 16 | 3 | 4 |
| Properties of cured film | Scratch resistance (PMMA resin ball) | A | A | A | B | A | A | A | B | C | D |
| | Scratch resistance (scratch with nail) | A | A | A | B | A | A | A | B | C | D |
| | Water and scratch resistance | A | B | A | B | B | B | B | B | D | D |

According to the same process as the process performed in the case where the cyan pigment dispersion used in Example Composition 9 was prepared, a yellow pigment dispersion and a magenta pigment dispersion were then prepared in the following manner.

A yellow pigment dispersion having a pigment solid content of 10% by mass and a P/B ratio of 3:1 was prepared according to the same process as the preparation process of Example Composition 9 except that C.I. Pigment Yellow 13 was used as the pigment.

A magenta pigment dispersion having a pigment solid content of 10% by mass and a P/B ratio of 3:1 was prepared according to the same process as the preparation process of Example Composition 9 except that C.I. Pigment Red 122 was used as the pigment.

The respective pigment dispersions were then used to prepare a yellow ink and a magenta ink according to the same process as in the cyan ink.

The cyan ink of Example Composition 9 was combined with the yellow ink and magenta ink obtained above to make an ink set. This ink set was used to record an image on offset paper "OK KINFUJI" (product of MITSUBISHI PAPER MILLS LIMITED) by means of the same ink jet recording apparatus as that used for Example Composition 9. Specifically, an image obtained by applying the yellow ink at 100% duty to the whole surface of a printing region, an image obtained by applying the magenta ink at 100% duty to the whole surface of a printing region, and an image (image of secondary color, red) obtained by alternately applying the yellow ink and magenta ink at each 50% duty for every pixel to apply the total inks of 100% duty to the whole surface of a printing region were formed. With respect to the yellow, magenta and red portions of the images formed in this manner, the scratch resistance and water resistance were evaluated according to the same evaluation methods and evaluation criteria as in Example Composition 9. The images formed according to the above-described process were regarded as 9Y, 9M and 9R, respectively. The evaluation results are shown in Table 5.

TABLE 5

| | | Evaluation results | | |
|---|---|---|---|---|
| | | 9Y | 9M | 9R |
| Properties of cured film | Scratch resistance (PMMA resin ball) | A | A | A |
| | Scratch resistance (scratch with nail) | A | A | A |
| | Water and scratch resistance | A | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-098781, filed Apr. 22, 2010, which is hereby incorporated by reference herein in its entirety.

What is claimed is:

1. An ink jet recording method comprising:
an application step of applying an ink jet recording liquid composition to a recording medium by an ink jet system;
a heating step of heating the recording medium at a temperature not lower than the melting point of the wax contained in the ink jet recording liquid composition; and
a curing step of curing the ink jet recording liquid composition by irradiating the recording medium with an energy ray,
wherein the heating step and the curing step are conducted after the application step,
wherein the ink jet recording liquid composition is an active energy ray curable ink jet recording liquid composition comprising (1) a polymerizable compound, (2) an active energy ray radical polymerization initiator, (3) a wax having a melting point of 40° C. or more and 120° C. or less, and (4) water.

2. The ink jet recording method according to claim 1, wherein the wax is composed of only carbon and hydrogen.

3. The ink jet recording method according to claim 1, wherein the active energy ray curable ink jet recording liquid composition further comprises a coloring material.

* * * * *